United States Patent
Anderson et al.

(10) Patent No.: US 10,677,010 B2
(45) Date of Patent: Jun. 9, 2020

(54) SHEAR BLADE

(71) Applicant: Enovate Systems Limited, Aberdeenshire (GB)

(72) Inventors: Paul Anderson, Aberdeen (GB); Jeffrey Charles Edwards, Aberdeen (GB)

(73) Assignee: ENOVATE SYSTEMS LIMITED, Aberdeen (GB)

( * ) Notice: Subject to any disclaimer, the term of this patent is extended or adjusted under 35 U.S.C. 154(b) by 297 days.

(21) Appl. No.: 15/689,069

(22) Filed: Aug. 29, 2017

(65) Prior Publication Data
US 2018/0058170 A1    Mar. 1, 2018

(30) Foreign Application Priority Data

Aug. 31, 2016   (GB) .................................. 1614712.6

(51) Int. Cl.
| | |
|---|---|
| *E21B 33/06* | (2006.01) |
| *E21B 29/08* | (2006.01) |
| *E21B 34/02* | (2006.01) |
| *F16K 3/30* | (2006.01) |

(52) U.S. Cl.
CPC ............ *E21B 33/063* (2013.01); *E21B 29/08* (2013.01); *E21B 34/02* (2013.01); *F16K 3/30* (2013.01)

(58) Field of Classification Search
None
See application file for complete search history.

(56) References Cited

U.S. PATENT DOCUMENTS

| | | | |
|---|---|---|---|
| 3,687,166 A | * | 8/1972 | Herrin .................... F16K 3/02 138/94 |
| 3,817,326 A | | 6/1974 | Meynier |
| 3,946,806 A | | 3/1976 | Meynier, III |
| 4,132,265 A | | 1/1979 | Williams, Jr. |
| 4,313,496 A | | 2/1982 | Childs et al. |
| 4,448,101 A | * | 5/1984 | Templeton ............. B26D 1/205 83/374 |
| 4,508,313 A | | 4/1985 | Jones |
| 4,519,577 A | | 5/1985 | Jones |
| 4,580,626 A | | 4/1986 | Jones |

(Continued)

FOREIGN PATENT DOCUMENTS

| | | |
|---|---|---|
| DE | 3115623 A1 | 2/1982 |
| EP | 2484860 A2 | 8/2012 |

(Continued)

*Primary Examiner* — Shane Bomar
(74) *Attorney, Agent, or Firm* — Tarolli, Sundheim, Covell & Tummino LLP

(57) ABSTRACT

A shear blade 10 for a downhole apparatus 50 comprises a body portion 12 and a first cutting edge 21 provided at a cutting end of the shear blade 10, the first cutting edge 21 comprising a sharp edge 22 located at or near a central region of the first cutting edge 21 and at least one blunt edge 23 located at or near at least one outer portion of the first cutting edge 21. In an embodiment, the shear blade 10 has a recess or slot 40 which is provided at or near a central region of a shear face 30 and which extends partially between a first side 27 and a second side 28 and which is generally aligned with the sharp edge 22 of the first cutting edge 21 in a plane substantially parallel to an axis of the throughbore and perpendicular to the first cutting edge 21.

23 Claims, 12 Drawing Sheets

(56) References Cited

U.S. PATENT DOCUMENTS

| | | | |
|---|---|---|---|
| 4,646,825 A | 3/1987 | Van Winkle | |
| 4,923,005 A | 5/1990 | Laky et al. | |
| 4,986,360 A | 1/1991 | Laky et al. | |
| 5,360,061 A | 11/1994 | Womble | |
| 5,400,857 A | 3/1995 | Whitby et al. | |
| 5,515,916 A | 5/1996 | Haley | |
| 6,173,770 B1 | 1/2001 | Morrill et al. | |
| 6,244,336 B1 | 6/2001 | Kachich | |
| 8,162,046 B2 | 4/2012 | Jahnke | |
| 8,167,031 B2 | 5/2012 | Jahnke | |
| 8,443,879 B2 | 5/2013 | Jahnke | |
| 8,443,880 B1 | 5/2013 | Jahnke et al. | |
| 8,632,047 B2 | 1/2014 | Hall et al. | |
| 9,097,082 B2 | 8/2015 | Hoang | |
| 2008/0105436 A1* | 5/2008 | Molina | E21B 33/063 166/365 |
| 2012/0043068 A1 | 2/2012 | Jahnke | |
| 2012/0043083 A1 | 2/2012 | Jahnke | |
| 2012/0168651 A1 | 7/2012 | Jahnke | |
| 2013/0119283 A1 | 5/2013 | Jahnke | |
| 2013/0153204 A1 | 6/2013 | Carbaugh et al. | |
| 2013/0341870 A1 | 12/2013 | Hoang | |
| 2014/0110611 A1 | 4/2014 | Mcclanahan et al. | |
| 2016/0032679 A1 | 2/2016 | Hoang | |

FOREIGN PATENT DOCUMENTS

| | | |
|---|---|---|
| EP | 2484860 A3 | 9/2013 |
| EP | 2995768 A1 | 3/2016 |
| FR | 2480848 A1 | 10/1981 |
| GB | 2018330 A | 10/1979 |
| GB | 2074491 A | 11/1981 |
| GB | 2131470 A | 6/1984 |
| GB | 2166784 A | 5/1986 |
| GB | 2166785 A | 5/1986 |
| GB | 2166786 A | 5/1986 |
| GB | 2257733 A | 1/1993 |
| WO | 92/13170 | 8/1992 |
| WO | 99/49179 A1 | 9/1999 |

* cited by examiner

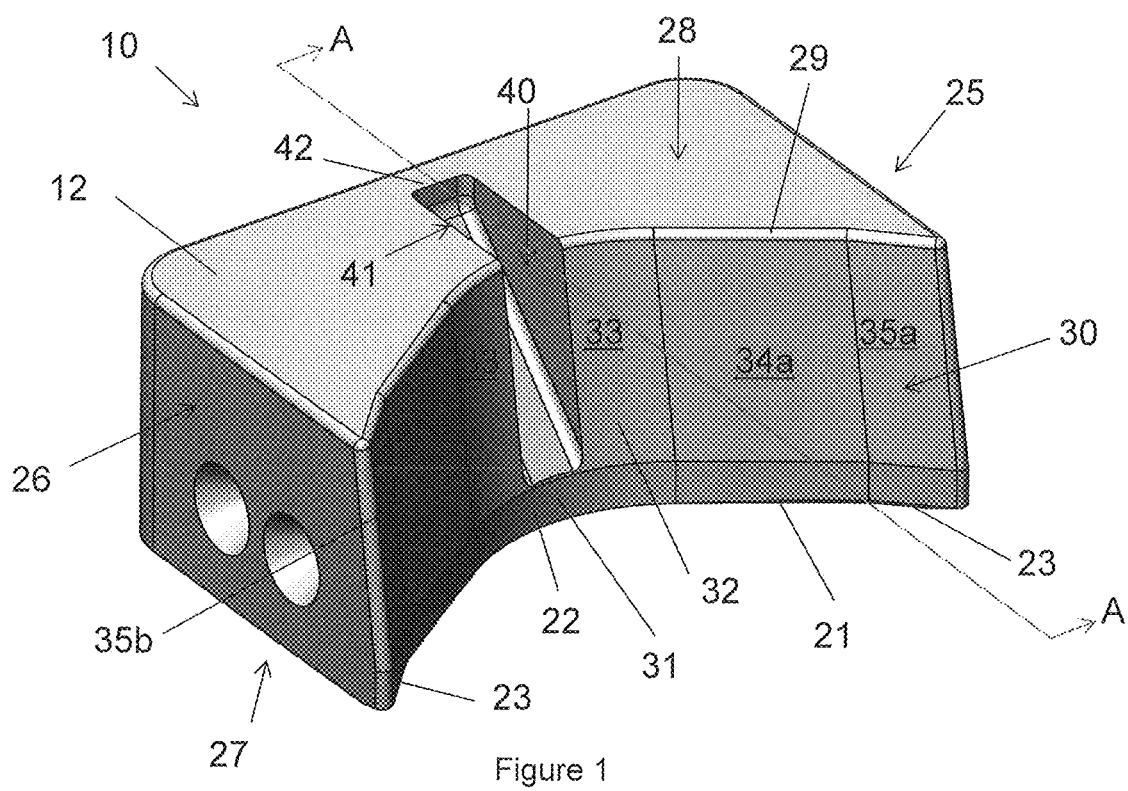
Figure 1
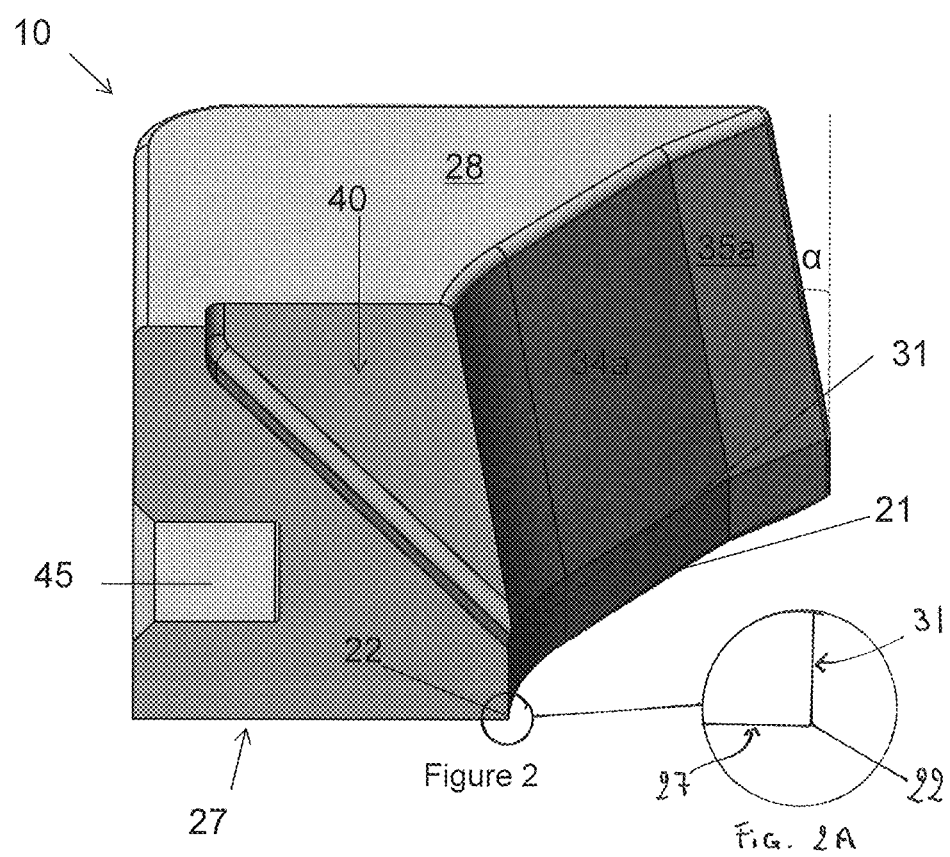
Figure 2
FIG. 2A

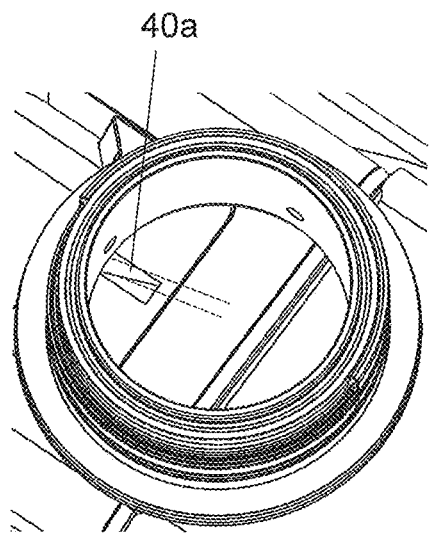
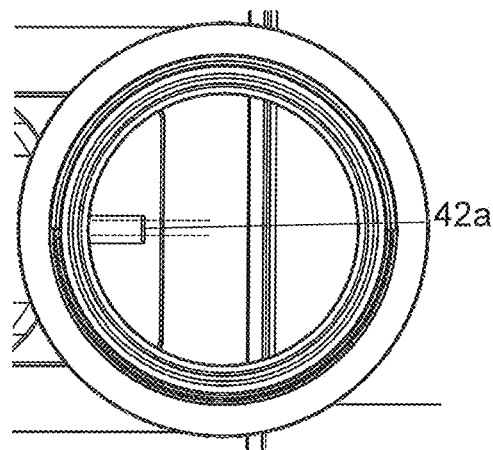
Figure 19
Figure 20
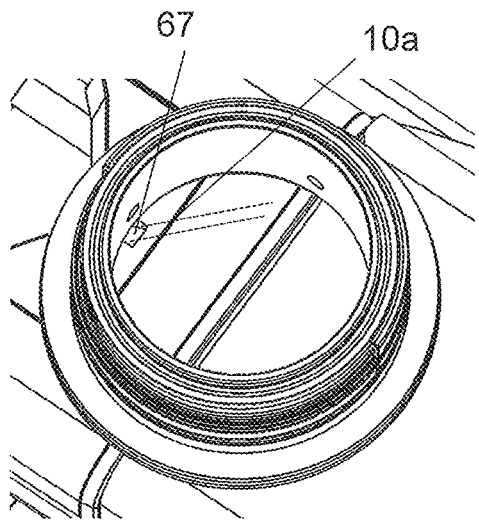
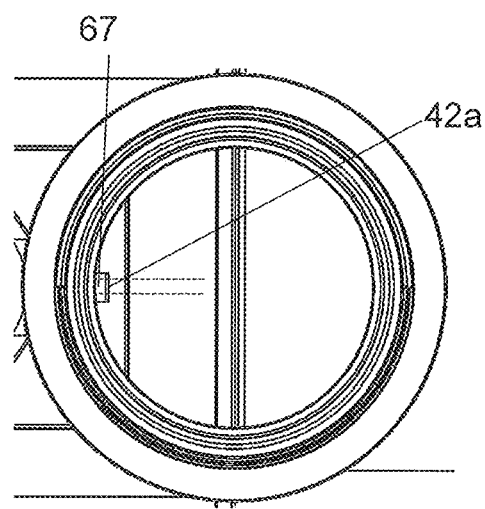
Figure 21
Figure 22

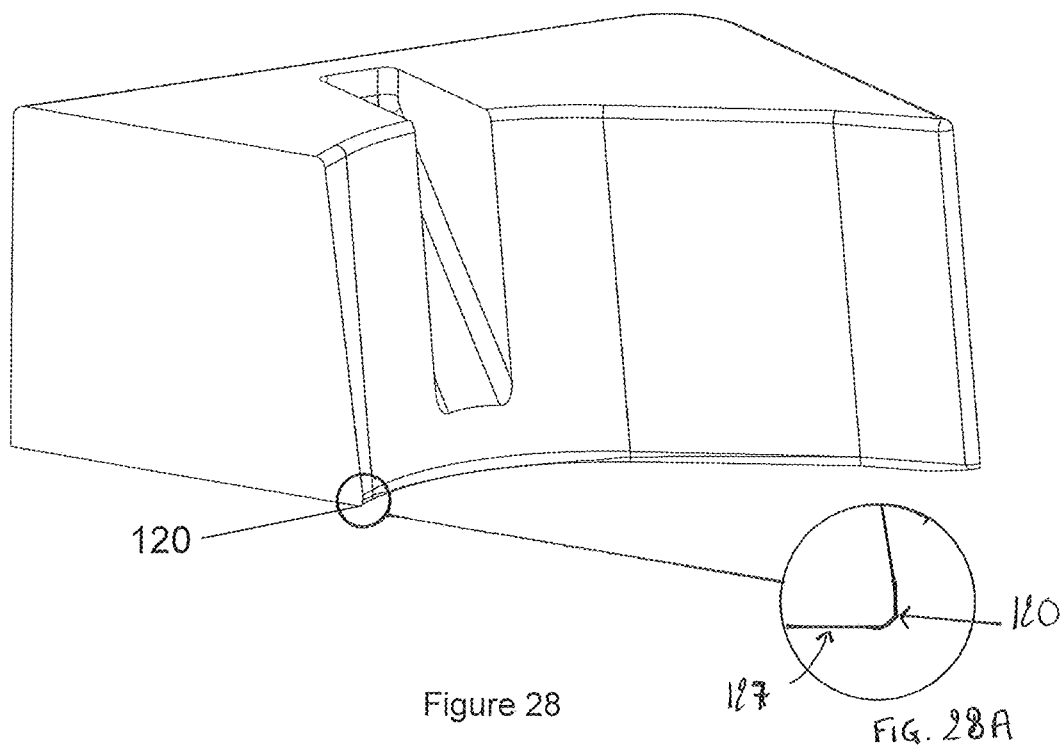
Figure 28
FIG. 28A
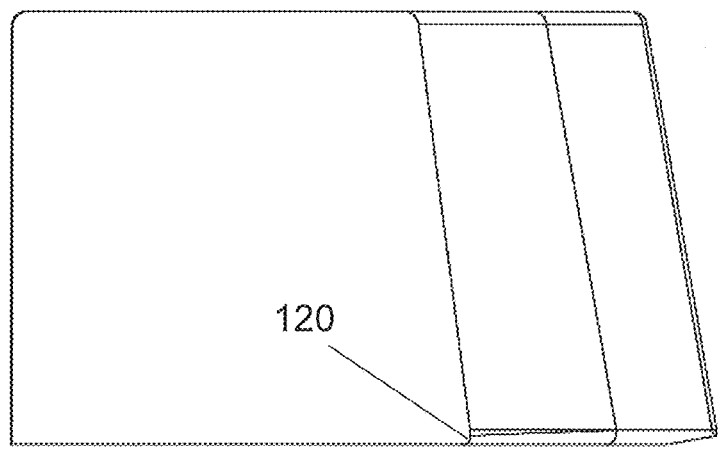
Figure 29

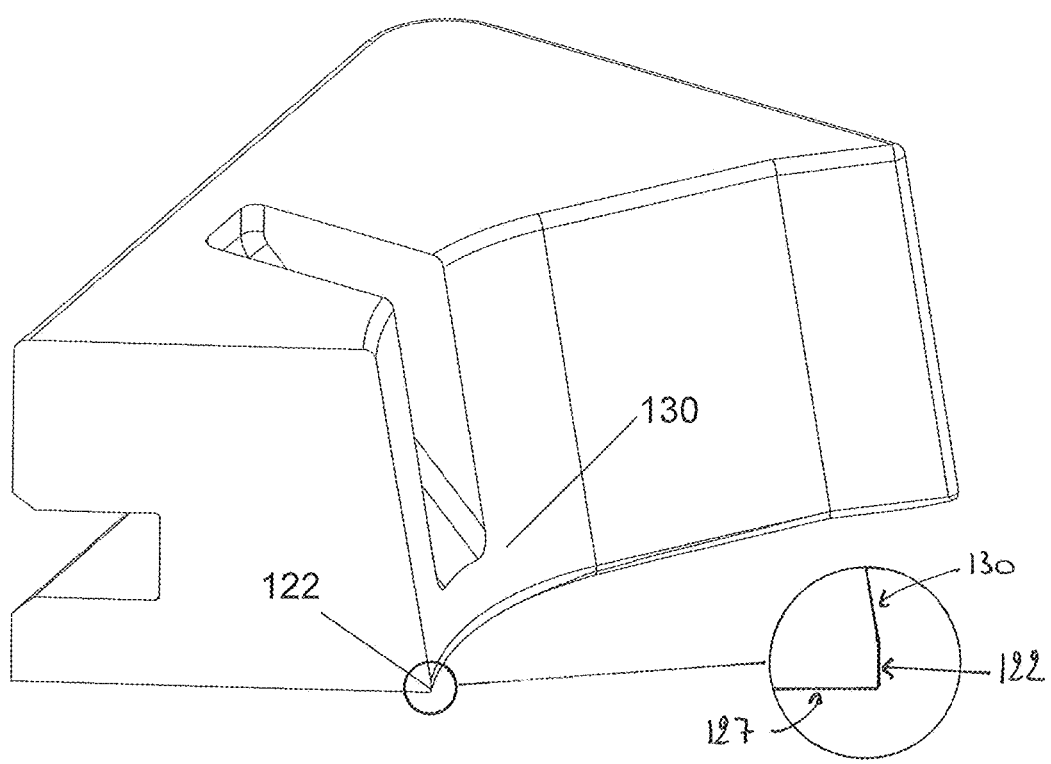
Figure 30
FIG. 30A
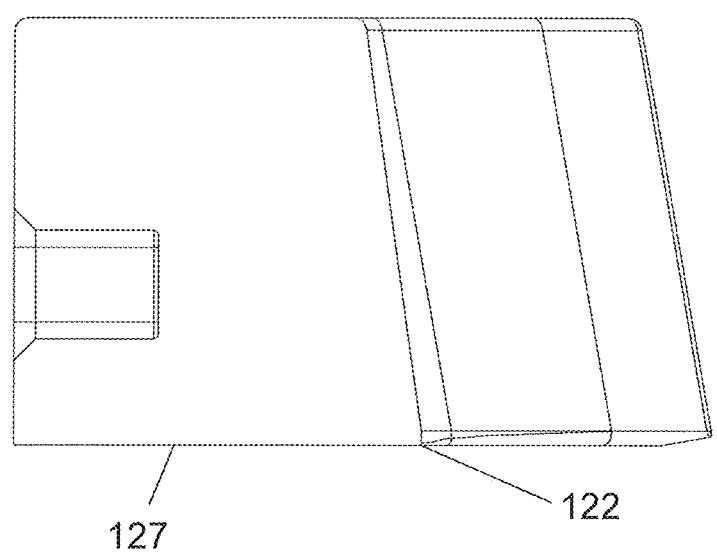
Figure 31

SHEAR BLADE

FIELD OF INVENTION

The present invention relates to a shear blade for cutting and/or shearing an object in a wellbore, to a blowout preventer including a shear blade, and to related methods for cutting and/or shearing an object in a wellbore. More particularly, but not exclusively, the invention relates to a shear blade for use on a blowout preventer gate or ram.

BACKGROUND TO THE INVENTION

A blowout preventer (BOP) is a safety assembly which is provided at a desired location in a wellbore and is adapted to seal the throughbore of the assembly in an emergency situation. Conventional BOPs generally have a number of wellbore sealing members which can be deployed across the throughbore of the assembly in order to seal the wellbore. Such wellbore sealing members are typically provided in the form of gates or rams. There are usually a number of opposed gates or rams, typically provided in pairs on either side of the throughbore, and which are movable in a plane transverse or perpendicular to the throughbore. In the event of an emergency, the rams/gates are moved towards each other to cut any object in the wellbore and seal the wellbore.

In order to allow shearing of any object that may be located in the wellbore, the rams/gates are provided with cutting/shearing blades configured to cut through any wellbore equipment which may be located between the rams, such as a tubular or a wireline. Once the rams/gates have severed through the wellbore equipment, and are engaged with each other and/or with a respective seal seat, the wellbore is sealed.

International Patent Application Publication No. WO 92/13170 (Smith et al) discloses a shear ram blowout preventer apparatus having an upper ram block having an inset in a laterally inward surface thereof, to aid in positioning a borehole retrievable, for example, a multi-strand cable, for cutting relative to a notch of a blade member.

U.S. Pat. No. 4,986,360 (Laky et al) discloses a system for handling reeled tubing, the system including a pair of cutting blades having horizontally extending cutting edges, and semi-circular cut-outs adjacent the cutting edges to assist in maintaining a cut and crimped pipe in semi-circular form.

A problem in the prior art is the inability of the gates to effectively cut or shear the different types of objects that may be located in the wellbore in the event of an emergency.

It is an object of the present invention to eliminate or mitigate one or more of the disadvantages associated with the prior art.

SUMMARY OF THE INVENTION

According to a first aspect of the present invention there is provided a shear blade for a downhole apparatus, the shear blade comprising:
 a body portion; and
 a first cutting edge provided at a cutting end of the shear blade, the first cutting edge comprising a sharp edge located at or near a central region of the first cutting edge, and at least one blunt edge located at or near at least one outer portion of the first cutting edge.

The terms "sharp" or "blunt" will be understood in the context of the present invention to relate to portions of a cutting edge of a blade which have different cutting profiles, the sharp edge being configured to cut more easily through wellbore equipment than the blunt edge. The sharp edge is designed to cut relatively easily to through wellbore equipment. For example, the sharp edge may be defined by adjacent surfaces which create a predetermined cutting angle, e.g. an angle of approximately 90°. The blunt edge may be defined as a portion of the first cutting edge which is blunted or rounded and/or which is less sharp than would be expected on a cutting blade and cuts less easily through the wellbore equipment, while still permitting the blade to perform its intended function. Thus, the sharp edge is sharper than the at least one blunt edge, while both the sharp edge and the blunt edge are capable of cutting or shearing wellbore equipment, e.g., a tubular.

Thus, in an embodiment of the present invention, there is provided a shear blade for a downhole apparatus, the shear blade comprising:
 a body portion; and
 a first cutting edge provided at a cutting end of the shear blade, the first cutting edge comprising a first or central edge portion located at or near a central region of the first cutting edge, and a second or outer edge portion located at or near at least one outer portion of the first cutting edge,
 wherein the first or central edge portion is sharper than the second or outer edge portion(s).

There may be provided a plurality of blunt edges, e.g. two blunt edges.

A blunt edge may be located on each side of the sharp edge.

Each blunt edge may extend between the sharp edge and a side portion, outer portion or peripheral portion of the blade or body portion thereof.

The provision of a sharp edge located in or near a central region of the first cutting edge may facilitate shearing of a substantially compact and/or solid object, such as a wireline.

The provision of one or more blunt edges located on an outer portion or outer portions of the first cutting edge may facilitate shearing of a tubular or hollow object, such as a tubular or pipe. It is believed that the provision of a blunt edge causes more stress to be applied to an object to be cut, e.g., a tubular object, before the object fails and is severed. This, in turn, may provide a "spring" effect in the severed object upon failure of the object due to the physical properties of the tubular material, typically metal, including for example elasticity and resilience, which may help separation of the severed object and/or rapid movement of the severed object away from the shear blade.

The provision of a sharp edge located at or near a central region of the first cutting edge, and of one or more blunt edges located at or near an outer portion or outer portions of the first cutting edge, may permit effective cutting of a substantially solid object, such as a wireline, in the central portion, while improving cutting of a larger and/or tubular object, such as a tubular or pipe near the outer portions.

The first cutting edge may have at least one intermediate edge between the sharp edge and a respective blunt edge. Preferably the first cutting edge may have an intermediate edge between the sharp edge and each blunt edge. The provision of an intermediate edge between the sharp edge and a respective blunt edge provides a smooth and progressive transition in the cutting profile of the first cutting edge between the sharp edge and the blunt edge(s).

Alternatively, one or more blunt edges may be located adjacent the sharp edge, e.g., on either side of the sharp edge and adjacent the sharp edge. Thus, a/the blunt edge may extend from the sharp edge to an outer portion of the first cutting edge. As such, the first cutting edge may be devoid of any intermediate edges between the sharp edge and a respective blunt edge. In such instance, an interface or connection between the sharp edge and an adjacent blunt edge may define a step, ramp, shoulder or the like.

When the first cutting edge does not have an intermediate edge between the sharp edge and a respective blunt edge, the length of the sharp edge may represent about 5-50%, e.g., about 10-30%, e.g. about 10-25% of the length of the first cutting edge. The length of the at least one blunt edge may represent about 50-95%, e.g., about 60-90%, e.g. about 70-90% of the length of the first cutting edge.

When the first cutting edge has an intermediate edge between the sharp edge and a respective blunt edge, the length of the sharp edge may represent about 5-50%, e.g., about 10-30%, e.g. about 10-25% of the length of the first cutting edge. The length of the at least one blunt edge may represent about 20-60%, e.g., about 30-50%, of the length of the first cutting edge. The length of the at least one intermediate edge may represent about 20-60%, e.g., about 30-50%, of the length of the first cutting edge.

The body portion may have a first side and a second side.

At least a portion of the first side and/or of the second side may extend in a direction substantially perpendicular to a main axis of the throughbore.

The body portion may include and/or may define a shear face. The shear face may extend between the first side and the second side.

The shear face is typically on a side of the blade facing the throughbore and/or facing an object located therein.

The first side may be the side nearest the first cutting edge of the blade.

Typically, the first cutting edge is provided at a forwardmost portion of the first side and/or at a forwardmost portion of the shear face, and/or the first cutting edge is provided at an edge between the first side and the shear face.

The shear blade may include a second cutting edge.

Typically, the second cutting edge is provided at a forwardmost portion of the second side, and/or the second cutting edge is provided at an edge between the second side and the shear face.

In use, the first edge is forward of the second edge relative to the throughbore, and/or the first cutting edge is nearer the throughbore than the second cutting edge. By such provision, in use, when the shear blade is activated, the first edge typically engages any object located in the throughbore before the second edge.

When more than one blade, e.g., a pair of blades, is/are provided in a/the downhole apparatus, one or both blades may be a shear blade according to the present invention. In other words, the upper blade, the lower blade, or each of the upper and lower blades, may be a shear blade of the present invention. When the upper blade is a shear blade of the present invention, the first side may be or may define a bottom side of the shear blade, and the second side may be or may define a top side of the shear blade. When the lower blade is a shear blade of the present invention, the first side may be or may define a top side of the shear blade, and the second side may be or may define a bottom side of the shear blade. By such provision, in use, the blades may be closed such that their respective first sides and/or first cutting edges move or slide proximal and/or in contact with one another.

Advantageously, the second cutting edge may be substantially blunt. The second cutting edge may have one or more blunt edge portions.

The provision of a second, blunt, cutting edge located at an edge between the second side and the shear face may facilitate secondary shearing of a tubular or hollow object, such as a tubular or pipe, following primary shearing via the first cutting edge. This may improve the effectiveness and reliability of the shear blade. It is believed that the provision of a blunt edge increases the stress applied to an object to be cut, e.g., a tubular object, which may also increase strain in the material before the object fails and is severed. This, in turn, may provide a "spring" effect in the severed object upon failure of the object due to the physical properties of the tubular material, typically metal, including for example elasticity and resilience of the material, typically metal, which may help separation of the severed object and/or rapid movement of the severed object away from the shear blade. Similar to the at least one blunt edge of the first cutting edge, the term "blunt" in respect of the second cutting edge means that the second cutting edge is rounded and/or curved, and/or is less sharp than would be expected on a cutting blade and cuts less easily through the wellbore equipment, e.g., a tubular, while still permitting the blade to perform its intended function.

Advantageously, the shear blade may include a recess or slot within a portion of the shear face.

The recess or slot may extend at least partially between the first side and the second side. Advantageously, the recess or slot may extend partially between the first side and the second side.

The recess or slot may extend between the second side and a portion of the shear face proximal, but not including, the sharp edge (or first or central edge portion) of the first cutting edge.

The recess or slot may extend between the second side and a portion of the shear face aligned with the sharp edge (first or central edge portion) of the first cutting edge.

The recess or slot may be provided at or near a central region of the shear face.

The recess or slot may be substantially aligned with the sharp edge of the first cutting edge in a direction and/or in a plane substantially parallel to a main axis of the throughbore, and/or in a plane substantially perpendicular to the first cutting edge. In use, when the main axis of the throughbore is substantially vertical, the recess or slot may be substantially vertically aligned with the sharp edge of the first cutting edge.

The recess or slot may extend in a plane substantially parallel to a main axis of the throughbore and/or in a plane extending in a closing direction of the blade and/or in a plane perpendicular to the first cutting edge.

The recess or slot may be configured to accommodate an object to be cut, such as a wireline.

The provision of a recess or slot aligned with the sharp edge may help prevent the object, e.g., wireline, from being folded over the shear face and/or second cutting edge. Thus, the provision of the recess or slot may allow effective and reliable closure of the shear blade following primary cutting of the object, e.g., wireline.

In an embodiment, the recess or slot may define a recess portion within the second side. The recess portion may have or may define a recess cutting edge facing the throughbore and/or object therein. The recess cutting edge may be defined by a portion of the second side.

The recess cutting edge may be configured to cut an object, e.g., wireline, accommodated and/or located within the recess or slot. By such provision, upon closure of the shear gate, the object, e.g., wireline, accommodated within the slot or recess, may be subject to secondary shearing to allow effective and reliable closure of the gate.

Thus, the recess cutting edge may be sharper than the second cutting edge.

Typically, the second, blunt, cutting edge may be provided on each side of the slot or recess.

The second, blunt, cutting edge may extend between the recess or slot and an outer or side portion of the blade or body portion thereof.

The downhole apparatus may comprise or may be a blowout preventer (BOP).

The shear blade may be attached, mounted and/or connected to a gate or ram.

Alternatively, the shear blade may be integral to the gate or ram.

The shear blade may be provided at a cutting end of the gate or ram and/or at an end of the ram facing towards the throughbore.

The shear face may extend between the first side and the second side, and/or may extend between the first cutting edge and the second cutting edge, at an angle, e.g. at an average angle, less than or equal to 90°.

The shear face may extend between the first side and the second side, and/or may extend between the first cutting edge and the second cutting edge, at an angle between 60 and 90°, e.g., between 70 and 90°, e.g., between 80 and 90°.

The shear face may extend at an angle between 80 and 90°, e.g., between 85 and 90°, e.g., approximately 90°, in a first shear face region directly above the first side and/or the first cutting edge.

The shear face may extend at an angle between 60 and 90°, e.g., between 70 and 90°, e.g., between 75 and 85°, e.g. approximately 80°, in a second shear face region directly below the second side and/or the second cutting edge. In one embodiment, the shear face may extend at an angle between 60 and 90°, e.g., between 70 and 90°, e.g., between 75 and 85°, e.g. approximately 80°, in a second shear face region containing the slot or recess.

A profile of the shear face may be contoured to suit a range of tubular sizes.

The shear face may be concave.

The shear face may have a plurality of adjacent sections which may vary in their degrees of concavity, e.g., which may each have a different degree of concavity.

The shear face may have a central section, e.g., a section containing the slot or recess.

The shear face may have one or more side, outer or peripheral sections on each side of the central region, each one or more side, outer or peripheral sections having a concavity greater than the concavity of an adjacent, more central, section.

In one embodiment, the shear face may comprise a first outer section on each side of the central section, the concavity of each first outer section being greater than the concavity of the central section. The shear face may comprise a second outer section on an outer side of each first outer section, the concavity of the second outer section being greater than the concavity of the adjacent first outer section. The shear face may comprise one or more further outer sections on an outer side of a respective adjacent section, the concavity of each further outer section being greater than the concavity of an adjacent inner section. The skilled person will appreciate that the shear face may have any number of adjacent sections, provided that the sections are of increasing concavity from a central region of the shear face towards the peripheral or outer regions of the shear face. By such provision, the shear face may be capable of accommodating an engaging various objects, such as tubulars, pipes, or wirelines, of different sizes.

According to a second aspect of the present invention, there is provided a shear blade for a downhole apparatus defining a throughbore having a main axis, the shear blade comprising:

a body portion defining a shear face;

a first cutting edge provided at a cutting end of the shear blade, wherein the shear blade comprises a recess or slot extending within a portion of the shear face in a plane substantially parallel to the main axis of the throughbore and/or in a plane substantially perpendicular to the first cutting edge.

The body portion may have a first side and a second side, the shear face extending between the first side and the second side.

The first side and/or the second side may extend substantially perpendicular to the throughbore.

The recess or slot may extend at least partially between the first side and the second side. Advantageously, the recess or slot may extend partially between the first side and the second side.

The recess or slot may extend between the second side and a portion of the shear face proximal, but not including, the sharp edge (or first or central edge portion) of the first cutting edge.

The recess or slot may extend between the second side and a portion of the shear face aligned with the sharp edge (or first or central edge portion) of the first cutting edge.

The recess or slot may be provided at or near a central region of the shear face.

Typically, the recess or slot may be substantially aligned with the sharp edge (or first or central edge portion) of the first cutting edge.

The recess or slot may be substantially aligned with the sharp edge of the first cutting edge in a direction substantially parallel to an axis of the throughbore. In use, the recess or slot may be substantially vertically aligned with the sharp edge of the first cutting edge.

The recess or slot may extend in a direction substantially parallel to an axis of the throughbore.

The recess or slot may be configured to accommodate an object to be cut, such as a wireline.

The provision of a recess or slot may help prevent the object, e.g., wireline, from being folded over the shear face and/or second cutting edge. Thus, the provision of the recess or slot may allow effective and reliable closure of the shear blade following primary cutting of the object, e.g., wireline.

In an embodiment, the recess or slot may define a recess portion within the second side. The recess portion may have or may define a recess cutting edge facing the throughbore and/or object therein.

The recess cutting edge may be defined by a portion of the second side.

The recess cutting edge may be configured to cut an object, e.g., wireline, accommodated and/or located within the recess or slot.

By such provision, upon closure of the shear gate, the object, e.g., wireline, accommodated within the slot or recess, may be subject to secondary shearing to allow effective and reliable closure of the gate.

The features described in connection with any other aspect of the invention may apply to the shear blade according to the second aspect of the invention, and are therefore not repeated here for brevity.

According to a third aspect of the present invention there is provided a shear blade for a downhole apparatus, the shear blade comprising:

a body portion; and a first cutting edge provided at a cutting end of the shear blade, the first cutting edge comprising a sharp edge located at or near a central region of the first cutting edge, at least one blunt edge located at or near at least one outer portion of the first cutting edge, and at least one intermediate edge between the sharp edge and a respective blunt edge.

Preferably the first cutting edge may have an intermediate edge between the sharp edge and each blunt edge.

The provision of an intermediate edge between the sharp edge and a respective blunt edge provides a smooth and progressive transition in the cutting profile of the first cutting edge between the sharp edge and the blunt edge(s).

The features described in connection with any other aspect of the invention may apply to the shear blade according to the third aspect of the invention, and are therefore not repeated here for brevity.

According to a fourth aspect of the present invention there is provided a blowout preventer having a shear blade, the shear blade comprising:

a body portion; and a first cutting edge provided at a cutting end of the shear blade, the first cutting edge comprising a sharp edge located at or near a central region of the first cutting edge, and at least one blunt edge located at or near at least an outer portion of the first cutting edge.

The blowout preventer may comprise a plurality of, e.g. a pair of, shear blades.

The shear blade(s) may be provided within a housing of the blowout preventer.

When there are provided a pair of shear blades, the blowout preventer may comprise a shear blade on each side of the throughbore, in an open configuration.

The shear blades may be longitudinally spaced such that, in use, the blades may be closed so as to act together and cut an object located within the throughbore, one blade being located above the other in a closed configuration.

The shear blade may be a shear blade according to the first aspect or the third aspect of the invention.

The features described in connection with any other aspect of the invention may apply to the blowout preventer according to the fourth aspect of the invention, and are therefore not repeated here for brevity.

According to a fifth aspect of the present invention there is provided a blowout preventer defining a throughbore having a main axis, the blowout preventer having a shear blade, the shear blade comprising:

a body portion defining a shear face;

a first cutting edge provided at a cutting end of the shear blade, wherein the shear blade comprises a recess or slot extending within a portion of the shear face in a plane substantially parallel to the main axis of the throughbore and/or in a plane substantially perpendicular to the first cutting edge.

The blowout preventer may comprise a plurality of, e.g. a pair of shear blades.

The shear blade(s) may be provided within a housing of the blowout preventer.

When there are provided a pair of shear blades, the blowout preventer may comprise a shear blade on each side of the throughbore, in an open configuration.

The shear blade may be a shear blade according to the second aspect of the invention.

The features described in connection with any other aspect of the invention may apply to the blowout preventer according to the fifth aspect of the invention, and are therefore not repeated here for brevity.

According to a sixth aspect of the present invention there is provided a method of shearing a tubular in a wellbore, the method comprising:

providing a tubular in the throughbore of a blowout preventer, the blowout preventer comprising a housing defining the throughbore, and a shear blade, the shear blade having a first cutting edge provided at a cutting end thereof, the first cutting edge comprising at least one blunt edge located at or near at least one outer portion of the first cutting edge;

moving the shear blade across the throughbore so as to engage the at least one blunt edge of the first cutting edge of the shear blade with the tubular, and cutting the tubular at least partially via the at least one blunt edge of the first cutting edge of the shear blade.

The shear blade may have a sharp edge located at or near a central region of the first cutting edge. The shear blade may be a shear blade according to the first aspect of the invention.

The shear blade may have at least one intermediate edge between the sharp edge and a respective blunt edge. Preferably the first cutting edge may have an intermediate edge between the sharp edge and each blunt edge. The shear blade may be a shear blade according to the third aspect of the invention.

In use, during closure of the shear blade, continuous movement of the shear blade may cause the at least one blunt edge of the first cutting edge of the shear blade to engage and deform the tubular. It is believed that the provision of a blunt edge increases the stress applied to the tubular which may also increase strain in the material during engagement and/or deformation thereof, before the tubular fails and is severed. This, in turn, may provide a "spring" effect in the severed tubular upon failure thereof due to the physical properties of the material, typically metal, including for example elasticity and resilience, which may help separation of the severed tubular and/or rapid movement thereof away from the shear blade.

The method may further comprise engaging a portion of the tubular with the sharp edge of the first cutting edge of the shear blade. The method may comprise cutting through a portion of the tubular via the sharp edge and another portion of the tubular via the at least one blunt edge of the first cutting edge of the shear blade.

When the first cutting edge has one or more intermediate edges, the method may further comprise engaging a portion of the tubular with the intermediate edge(s) of the first cutting edge of the shear blade.

It will be appreciated that, depending on various parameters such as size, diameter, shape, rigidity, strength, etc, of the tubular, the sharp edge of the first cutting edge may engage the tubular either before, simultaneously with, or after the at least one blunt edge of the first cutting edge engages the tubular. Similarly, when the first cutting edge has one or more intermediate edges, the intermediate edge(s) of the first cutting edge may engage the tubular either before, simultaneously with, or after the at least one blunt edge of the first cutting edge engages the tubular.

In one embodiment, for example when the tubular has a relatively large diameter, the at least one blunt edge of the first cutting edge of the shear blade engages the tubular first. Upon further movement and closure of the shear blade, when the first cutting edge at least one intermediate edge, the at least one intermediate edge of the first cutting edge of the shear blade engages the tubular. Upon further movement and closure of the shear blade, the sharp edge of the first cutting edge of the shear blade engages the tubular. In such instance shearing of the tubular may begin either before, simultaneously with, or after, the sharp edge of the first cutting edge engages the tubular. For example, if the tubular is relatively flexible/deformable, initial engagement of the tubular with the at least one blunt edge of the first cutting edge may deform the tubular until the at least one intermediate and or the edge sharp edge of the first cutting edge also engages the tubular and before shearing begins. If the tubular is relatively rigid, initial engagement of the tubular with the at least one blunt edge of the first cutting edge may deform the tubular and shearing of the tubular may begin before the sharp edge and/or before the at least one intermediate edge of the first cutting edge engages the tubular.

In another embodiment, for example when the tubular has a relatively small diameter, the sharp edge of the first cutting edge of the shear blade engages the tubular first. Upon further movement and closure of the shear blade, when the first cutting edge at least one intermediate edge, the at least one intermediate edge of the first cutting edge of the shear blade engages the tubular. Upon further movement and closure of the shear blade, the at least one blunt edge of the first cutting edge of the shear blade engages the tubular.

The BOP may have a plurality of shear blades, such as a pair of shear blades, at least one of which is a shear blade according to the first aspect or the third aspect of the invention.

The features described in connection with any other aspect of the invention may apply to the method according to the sixth aspect of the invention, and are therefore not repeated here for brevity.

According to a seventh aspect of the present invention there is provided a method of shearing a wireline in a wellbore, the method comprising:

providing a wireline in the throughbore of a blowout preventer, the blowout preventer comprising a housing defining the throughbore, and a shear blade, the shear blade having a body portion defining a shear face and a first cutting edge provided at a cutting end of the shear blade, wherein the shear blade comprises a recess or slot extending within a portion of the shear face in a plane substantially parallel to a main axis of the throughbore and/or in a plane substantially perpendicular to the first cutting edge;

moving the shear blade across the throughbore to shear the wireline via the first cutting edge, and locating a severed portion of the wireline in the recess or slot.

The provision of a recess or slot may help prevent the wireline from being folded over the shear face of the shear blade. Thus, the provision of the recess or slot may allow effective and reliable closure of the shear blade following primary cutting of the object wireline.

The shear blade may be a shear blade according to the second aspect of the invention.

The method may further comprise shearing the severed portion of the wireline via a recess cutting edge, the recess cutting edge being defined by a recess portion of the recess or slot facing the throughbore. Thus, the method may comprise shearing the severed portion of the wireline accommodated and/or located within the recess or slot, thus performing secondary cutting of the wireline.

The features described in connection with any other aspect of the invention may apply to the method according to the seventh aspect of the invention, and are therefore not repeated here for brevity.

BRIEF DESCRIPTION OF DRAWINGS

Embodiments of the invention will now be described by way of example only, and with reference to the accompanying drawings, which are:

FIG. 1 a perspective view from above of a shear blade according to an embodiment of the present invention;

FIG. 2 an enlarged cross-sectional view of the shear blade of FIG. 1 taken along line (A-A);

FIG. 2A an enlarged view of the sharp edge shown in FIG. 2;

FIGS. 7 to 22 perspective views and top views of a blowout preventer according to an embodiment of the present invention, showing the blowout preventer at various stages between an open configuration (FIGS. 7 and 8) and a near-closed configuration (FIGS. 21 and 22);

FIG. 28 a sectional view from above of the shear blade of FIG. 23 taken along line (C-C);

FIG. 28A an enlarged view of an intermediate edge shown in FIG. 28;

FIG. 29 a side view of the shear blade of FIG. 28;

FIG. 30 a sectional view from above of the shear blade of FIG. 23 taken along line (D-D);

FIG. 30A an enlarged view of the sharp edge shown in FIG. 30;

FIG. 31 a side view of the shear blade of FIG. 30;

DETAILED DESCRIPTION OF DRAWINGS

Figure 3:
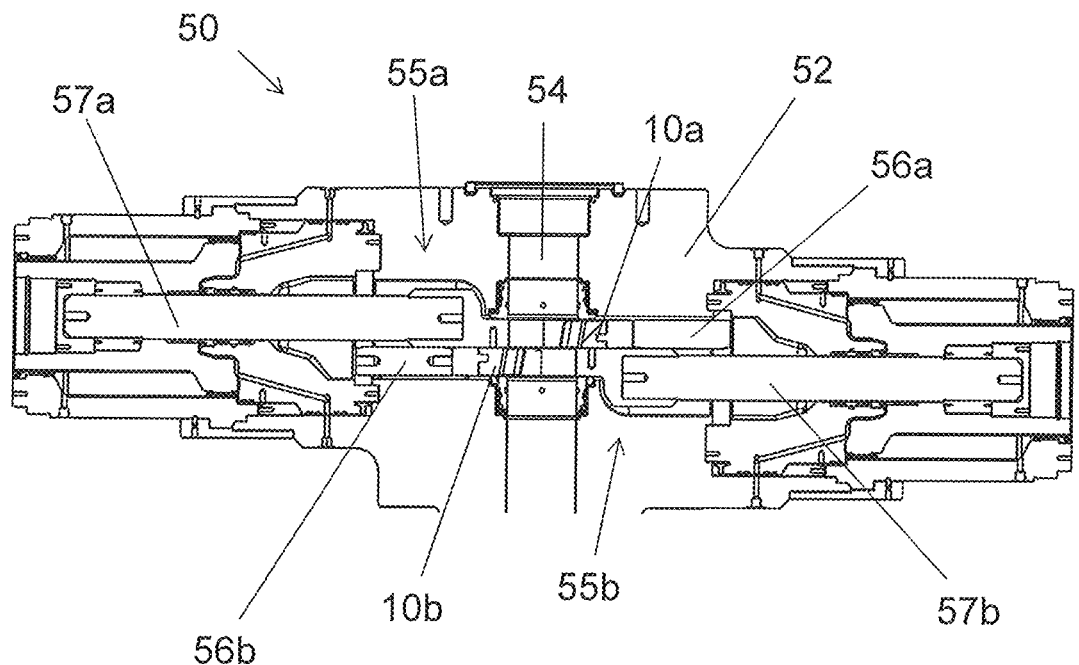
FIG. 3 a cross-sectional view of a blowout preventer according to an embodiment of the present invention, in an open configuration.

Referring to FIGS. 1 and 2 there are shown a perspective view from above and a cross-sectional view, respectively, of a shear blade, generally designated 10, according to an embodiment of the present invention.

The shear blade 10 has a body portion 12, and a first cutting edge 21 at a cutting end of the shear blade 10. The first cutting edge 21 has a sharp edge 22 located at or near a central region of the first cutting edge 21, and blunt edges 23 located near the outer portions of the first cutting edge 21 on each side of the sharp edge 22. Each blunt edge 23 extends between the sharp edge 22 and a respective side portion 25,26 of the blade 10. In this embodiment, the sharp edge defines a cutting angle of approximately 90°, as best shown in FIG. 2A, and the blunt edges 23 are rounded and/or curved.

The specific configuration of the first cutting edge, including the sharp edge and the blunt edges, and various embodiments thereof, will be discussed in more detail with reference to FIGS. 23 to 33.

The provision of a sharp edge 22 located in or near a central region of the first cutting edge 21 helps shearing of a substantially solid object, such as a wireline, in the central portion. The provision of one or more blunt edges 23 located near the outer portions of the first cutting edge 21 on each side of the sharp edge 22 helps shearing of a tubular or hollow object, such as a tubular or pipe, in the outer portions by applying more stress to the tubular before the tubular fails which, in turn, provides a "spring" effect in the severed tubular object upon failure. This helps separation of the severed tubular and/or rapid movement of the severed tubular away from the shear blade 10.

The body portion 12 of the blade 10 has a first side 27 and a second side 28, which, in this embodiment, extend in a direction substantially perpendicular to an axis of the throughbore. The first side 27 is herein defined as the side nearest the first cutting edge 21 of the blade. In this embodiment, the first side 27 is the lower side of the blade and the second side 28 is the upper side of the blade.

The body portion 12 defines a shear face 30 located on a side of the blade 10 facing the throughbore and/or facing an object located therein.

The first cutting edge 21 is provided at a forwardmost portion of the first side 27 and at a forwardmost portion of the shear face 30. In other words, the first cutting edge 21 is defined as the edge between the first side 27 and the shear face 30 which, as best shown in FIG. 2A, are substantially orthogonal.

The shear blade 10 also comprises a second cutting edge 29.

The second cutting edge 29 is provided at a forwardmost portion of the second side 28. Thus, the second cutting edge 29 is defined as the edge between the second side 28 and the shear face 30.

In use, in an open configuration, the first cutting edge 21 is located nearer the throughbore than the second cutting edge 29. By such provision, in use, when the shear blade 10 is activated, the first edge 21 typically engages any object located in the throughbore before the second edge 29.

In this embodiment, the second cutting edge 29 is substantially blunt, i.e., is rounded and/or curved. The provision of a second, blunt, cutting edge 29 located at an edge between the second side 28 and the shear face 30 may facilitate secondary shearing of a tubular or hollow object, such as a tubular or pipe, following primary shearing via the first cutting edge 21. This may improve the effectiveness and reliability of the shear blade 10.

The shear blade 10 also has a recess or slot 40, which is provided at or near a central region of the shear face 30 and which extends partially between the first side 27 and the second side 28. In this embodiment, the recess or slot 40 extends between the second side 28 and a portion 31 of the shear face 30 proximal the sharp edge 22 of the first cutting edge 21, and generally aligned with the sharp edge 22 of the first cutting edge 21 in a plane substantially parallel to an axis of the throughbore and perpendicular to the first cutting edge 21.

The recess or slot 40 allows the blade 10 to accommodate an object to be cut, such as a wireline. In particular, the provision of a recess or slot 40 aligned with the sharp edge 22 helps prevent the object, e.g., wireline, from being folded over the shear face 30 and/or second cutting edge 29. Thus, the provision of the recess or slot 40 permits effective and reliable closure of the shear blade following primary cutting of the object, e.g., wireline, via the first cutting edge 21.

In the embodiment, the recess or slot 40 defines a recess portion 41 within the second side 28. The recess portion 41 defines a recess cutting edge 42 facing the throughbore and/or object therein. Thus, the recess cutting edge 42 is defined by a portion of the second side 28.

The recess cutting edge 42 is configured to cut an object, e.g., wireline, accommodated and/or located within the recess or slot 40. By such provision, upon closure of the shear gate 10, the object, e.g., wireline, accommodated within the slot or recess 40, can undergo secondary shearing to allow effective and reliable closure of the gate 10.

The second, blunt, cutting edge 29 is provided on each side of the slot or recess 40, and extends between the recess or slot 40 and the outer or side portions 25,26 of the blade 10.

As best shown in FIG. 2, the shear face 30 has a first shear face region 31 directly above the first side 27 and the first cutting edge 21 of the blade 10. In the first shear face region 31, the shear face 30 extends at a rake angle of approximately 90°, i.e. substantially perpendicular to the moving direction of the gate 10. The shear face 30 also has a second shear face region 32 between the first shear face region 31 and the second cutting edge 29, which also contains the slot or recess 40. In the second shear face region 32, the shear face 30 typically lies at an angle α between 70 and 90°. In this embodiment α equals approximately 80°.

The profile of the shear face 30 is contoured to suit a range of tubular sizes. As shown in FIGS. 1 and 2, the shear face 30 is concave. The shear face 30 has a central section 33 containing the slot or recess 40, and a plurality of outer sections 34a,35a and 34b,35b, on each side of the central region 32, each outer section having a concavity greater than the concavity of an adjacent, more central, section.

While in this embodiment the shear face has a central portion 32 and two outer sections 34a,35a and 34b,35b on each side of the central region 32, the skilled person will appreciate that the shear face may have any number of adjacent sections, provided that the sections are of increasing concavity from the central region 32 of the shear face towards the peripheral or outer regions of the shear face 30. By such provision, the shear face 30 may be capable of accommodating and engaging various objects, such as tubulars, pipes, or wirelines, of different sizes.

As shown in FIG. 2, the shear blade 10 has a hole 45 configured to allow mounting of the shear blade on a gate or ram (as best shown in FIGS. 3 to 6), for example by conventional attachment means such as screws, bolts, or the like. It will be appreciated that, in an alternative embodiment, the shear blade 10 may form an integral part of the gate or ram.

Figure 4:
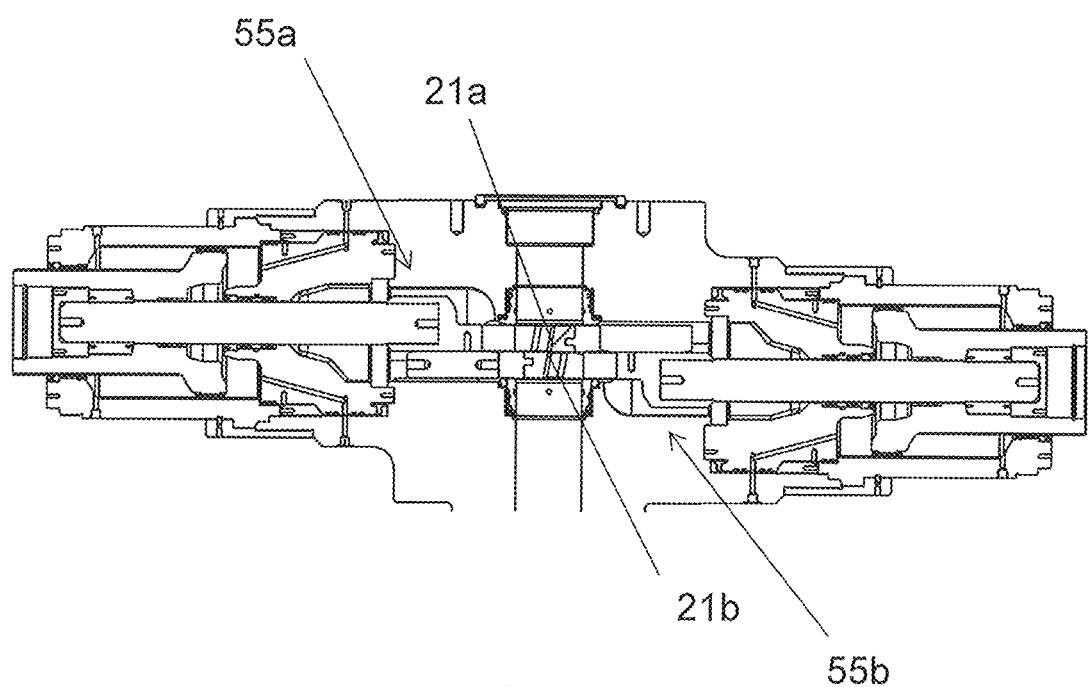
FIG. 4 a cross-sectional view of the blowout preventer of FIG. 3, in a part-closed "blade to blade" cutting configuration.
Figure 5:
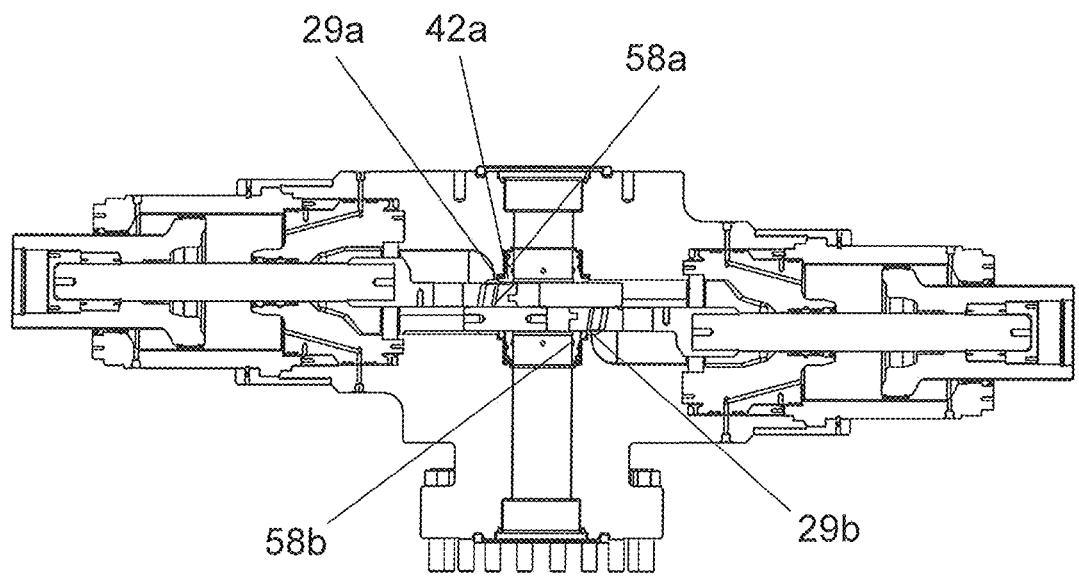
FIG. 5 a cross-sectional view of the blowout preventer of FIG. 3, in a part-closed "blade to seal" cutting configuration.
Figure 6:
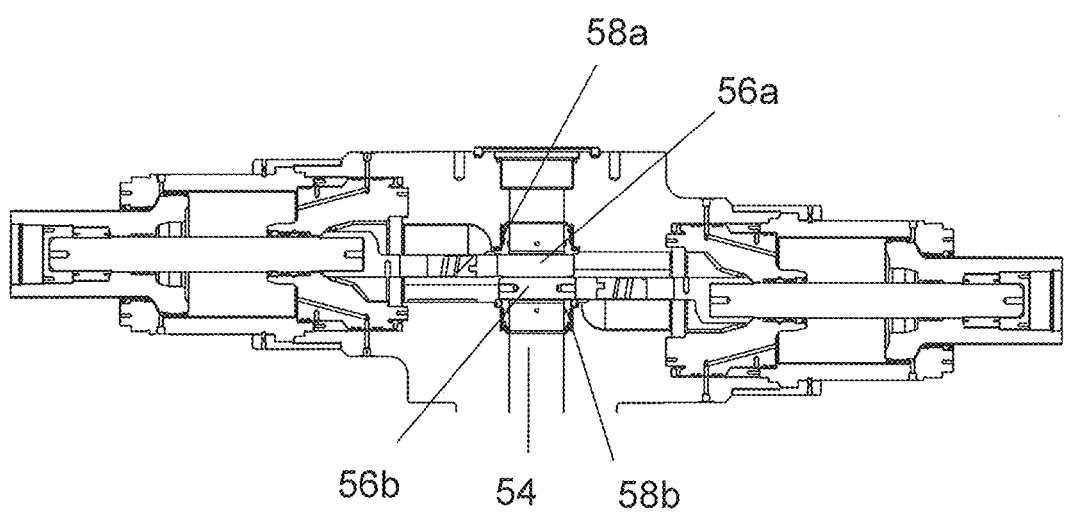
FIG. 6 a cross-sectional view of the blowout preventer of FIG. 3, in a closed configuration.

Referring now to FIGS. 3 to 6, there is shown a blowout preventer 50 according to an embodiment of the present invention. FIGS. 3 to 6 illustrate activation of blowout preventer 50 containing shear blade 10, from an open configuration (FIG. 3) to a closed configuration (FIG. 6).

The blowout preventer 50 comprises a housing 52 defining a throughbore 54.

The blowout preventer has a pair of gates 55a,55b including an upper gate 55a and a lower gate 55b. The gates 55a,55b are provided within the housing 52 of the BOP 50.

Each gate 55a,55b includes a respective shear blade 10a,10b mounted to a respective ram 56a,56b. Each ram 56a,56b has a respective actuator 57a,57b which is capable of moving its associated gate 55a,55b from an open configuration (FIG. 3) to a closed configuration (FIG. 6).

As shown in FIG. 3, in the open configuration, the gates 55a,55b, including shear blades 10a,10b, sit within a cavity 53 of the housing 52, on opposite side of the throughbore 54, such that the shear blades 10a,10b do not obstruct the throughbore.

Referring now to FIG. 4, the gates 55a,55b have been partly closed such that the first cutting edges 21a,21b at the cutting end of their respective shear blades 10a,10b are moved inwards towards the throughbore so as to shear any object located within the throughbore, thus completing primary shearing of the object. This may be described as the "blade to blade" cut point.

Referring now to FIG. 5, the gates 55a,55b have been closed further such that the first cutting edges 21a,21b at the cutting end of their respective shear blades 10a,10b have fully moved across the throughbore, thus creating an overlap between the upper shear blade 10a and lower shear blade 10b. As blades 10a,10b overlap, and should an upper section of the sheared object be left lying across the upper blade 10a, or a lower section of the sheared object be left lying across the lower blade 10b, secondary shearing can be carried out through the second cutting edges 29a,29b. If the object is a tubular, the tubular undergoes secondary shearing between second cutting edges 29a,29b and a respective seal seat 58a,58b. If the object is a wireline, the wireline undergoes secondary shearing between recess cutting edge 42a of upper shear blade 10a and respective seal seat 58a. This may be described as the "blade to seat" cut point, which will be described in more detail below with reference to FIGS. 7 to 22.

It will be appreciated that all gates need not contain a recess portion 40 and recess cutting edge 42. For example, as a wireline is cut via first cutting edges 21a,21b, a lower section of the cut wireline will usually fall down the wellbore, and therefore the shear blade 10b of lower gate 55b, does not, in this embodiment, contain a recess portion 40 and/or recess cutting edge 42. However, in other embodiments, for example when a wireline if not expected to freely move away from lower shear blade 10b, the lower shear blade 10b may be similar to the upper shear blade 10a and may have a recess portion 40 and/or recess cutting edge 42.

Referring now to FIG. 6, the gates 55a,55b have been fully closed such that rams 56a,56b overlap and close the throughbore 54 by forming a metal-to-metal seal with respective seal seats 58a,58b.

Referring now to FIGS. 7 to 22, there are shown enlarged portions of the blowout preventer 50 of FIG. 3, illustrating in more detail activation of blowout preventer 50 from an open configuration (FIG. 7) to a near-closed configuration (FIG. 22).

Figure 7:
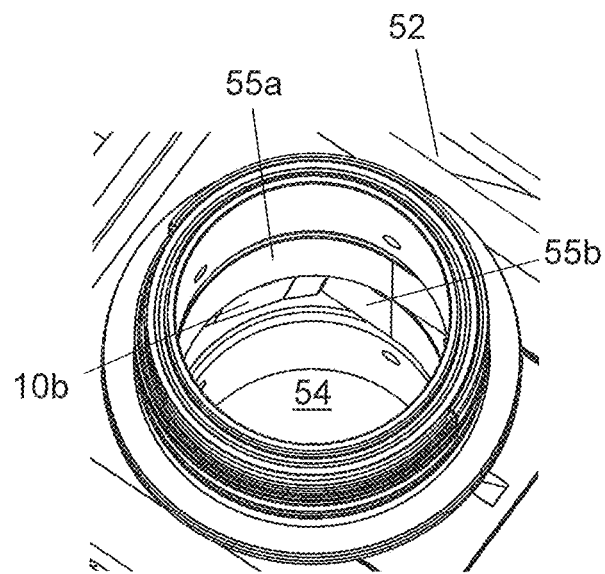
Figure 8:
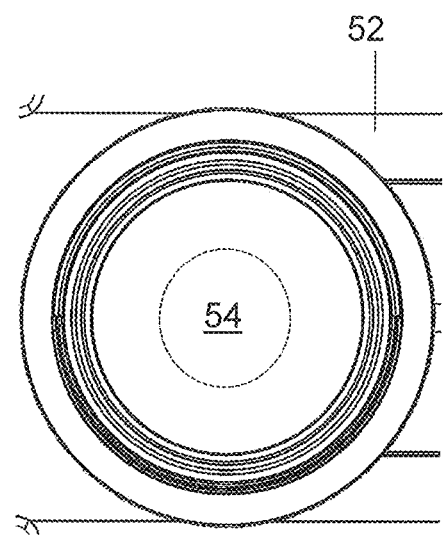

As shown in FIGS. 7 and 8, in the open configuration, the gates 55a,55b, including shear blades 10a,10b, sit within a cavity 53 of the housing 52, on opposite side of the throughbore 54, such that the shear blades 10a,10b do not obstruct the throughbore.

Figure 9:
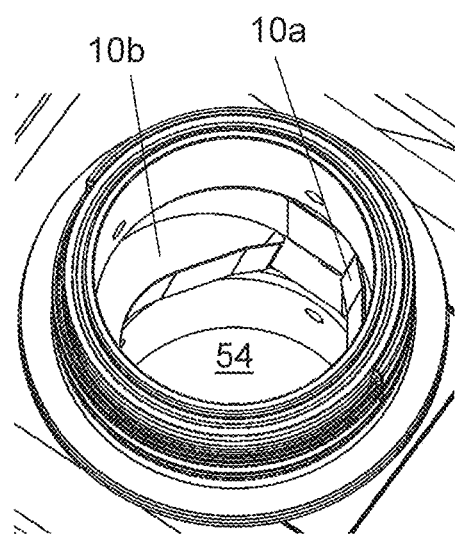
Figure 10:
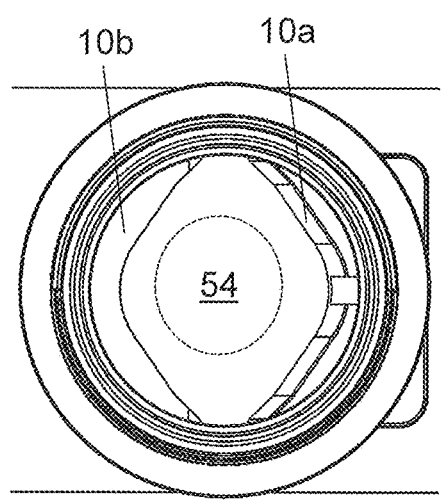
Figure 11:
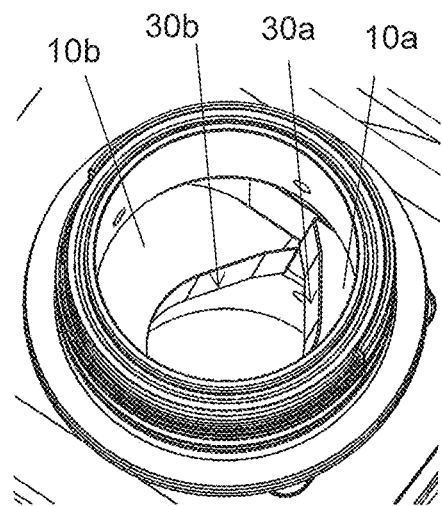
Figure 12:
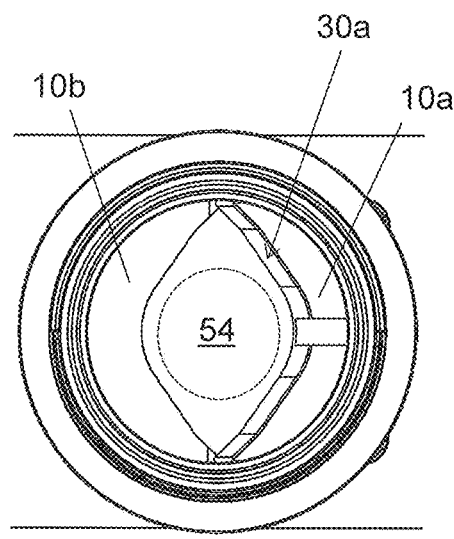

In FIGS. 9 and 10, the gates 55a,55b have started to close across the throughbore, showing each of upper shear blade 10a and lower shear blade 10b partially across the throughbore. As the gates 55a,55b move further across the throughbore (see FIGS. 11 and 12), the diameter of the throughbore is reduced. The opposing shear faces 30a,30b of the blades 10a,10b are contoured and have a concave profile to suit a range of tubular sizes, as explained above with reference to FIGS. 1 and 2. Thus, the opposing shear faces 30a,30b also act as a centralising mechanism for any object located in the throughbore at the point of closure. For example, a tubular located within the throughbore 54 is shown in broke lines in FIGS. 8, 10, 12.

Figure 13:
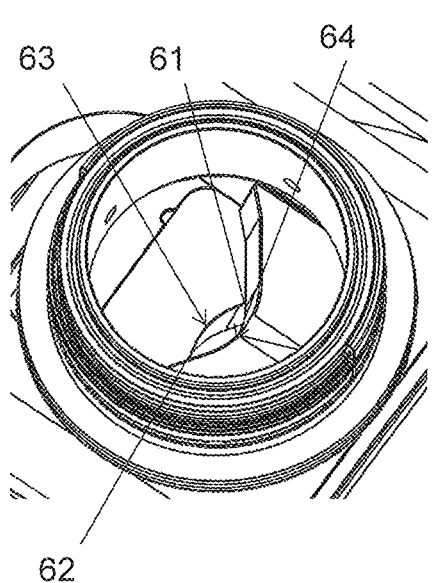
Figure 14:
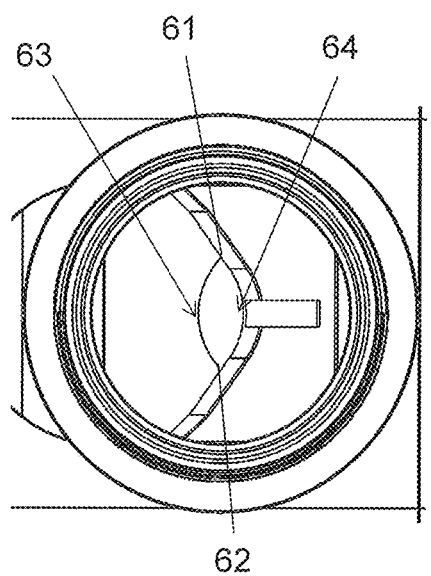

Referring to FIGS. 13 and 14, as the two blades 10a,10b begin to overlap, the object (not shown) continues to be centralised between the blades 10a,10b until its 'pinch' point, which may be defined as the point where both blades 10a,10b engage the object and begin shearing the object. A person of skill in the art will appreciate that the pinch point is dependent on the size of the object being sheared. For example, if the object is a typical tubular, the pinch point may occur at points 61,62 on blades 10a,10b. A tubular will typically be deformed upon initial engagement with the blades 10a,10b, until the opposing blades 10a,10b reach the pinch point where shearing occurs. If the object is a typical wireline, the pinch point may occur at points 63,64 on blades 10a,10b. A wireline will typically be centralised between the blades 10a,10b until the bore profile created by the blades 10a,10b is almost fully closed. At this point the sharp cutting edge 22a,22b in the center portion of the blades 10a,10b shear the wire at points 63,64.

Figure 15:
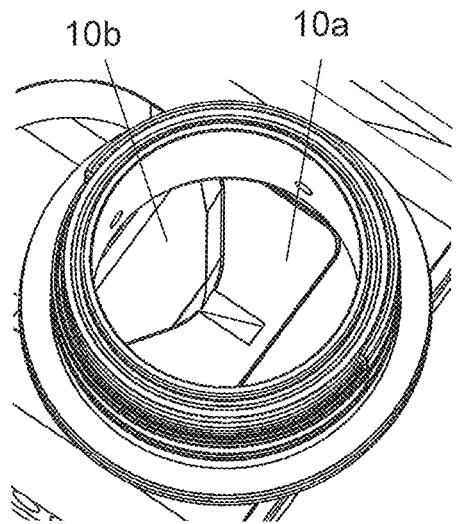
Figure 16:
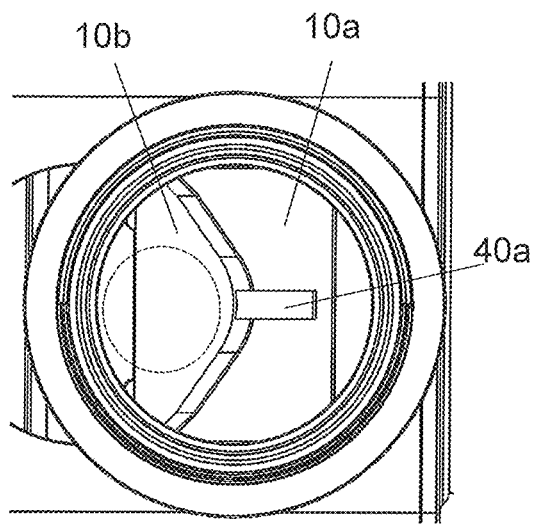
Figure 17:
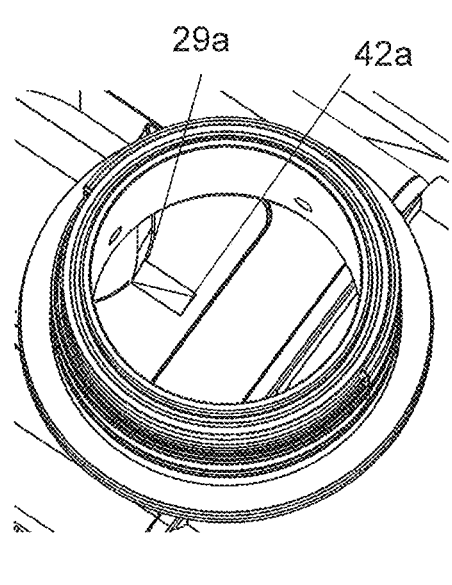

Referring to FIGS. 15 and 16, the gates 55a,55b have been closed further such that the shear blades 10a,10b overlap and the throughbore is closed. As blades 10a,10b overlap, and should an upper section of the sheared object be left lying across the upper blade 10a, secondary shearing can be carried out either via the second cutting edge 29a or via the recess cutting edge 42a, depending on the object being sheared.

Figure 18:
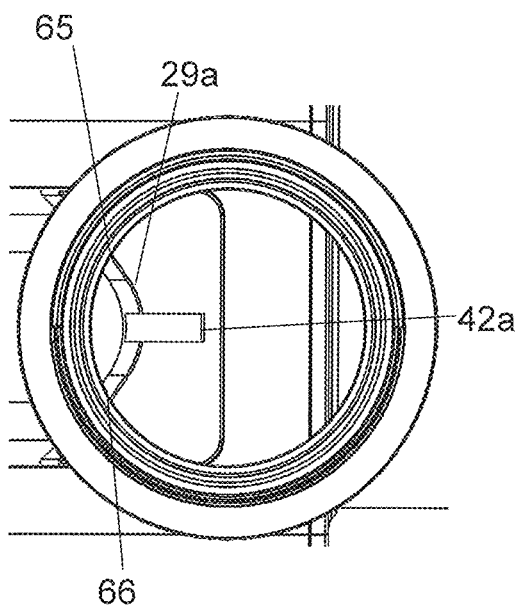

If the object is a tubular (shown in broken lines in FIG. 16), the tubular will be centralised by the shear face 30a of the upper blade 10a, until it comes into engagement with upper seal seat 58a, thus beginning secondary shearing of the tubular between second cutting edge 29a and upper seal seat 58a at pinch point represented by 65,66 in FIG. 18. This may be described as the "blade to seat" cut point. In this embodiment, the second cutting edge 29a is blunt, which may impart stress to an object during shearing and thus may improve separation of the sheared portions of the object, e.g., tubular, upon shearing.

If the object is a wireline (shown in broken lines in FIGS. 19-22), the wireline will be centralised by the shear face 30a of the upper blade 10a, and will be guided into the recess or slot 40a. As the upper gate 55a is closed further, as illustrated in FIGS. 19 to 22, the slot 40a retains the wireline and prevents it from being folded, squeezed or otherwise pulled across the sealing face of the upper seal seat 58a. As shown in FIGS. 21 and 22, the wireline finally comes into engagement with upper seal seat 58a, thus beginning secondary shearing of the tubular between the recess cutting edge 42a of upper shear blade 10a and respective seal seat 58a, at pinch point represented by '67' in FIGS. 21 and 22. This may be described as the "blade to seat" cut point.

Referring to FIGS. 23 to 31 there are shown various views of a shear blade, generally designated 110, according to an embodiment of the present invention. The shear blade of FIGS. 23 to 31 is generally similar to the shear blade of FIG. 1, like parts being denoted by like numerals, incremented by '100'.

In the shear blade 110 of FIGS. 23 to 31, the first cutting edge 121 has a sharp edge 122 located at or near a central region of the first cutting edge 121, and blunt edges 23 located near the outer portions of the first cutting edge 121. The first cutting edge 121 also has intermediate edges 120 between the sharp edge 122 and each blunt edge 123. The provision of an intermediate edge 120 between the sharp edge 122 and a respective blunt edge 123 provides a smooth and progressive transition in the cutting profile of the first cutting edge 121 between the sharp edge 122 and each blunt edge 123.

Figure 23:
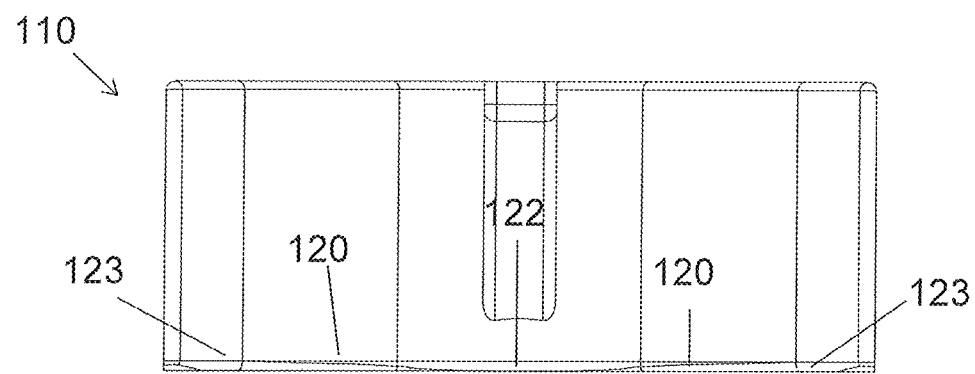
FIG. 23 a front view of a shear blade according to an embodiment of the present invention.
Figure 24:
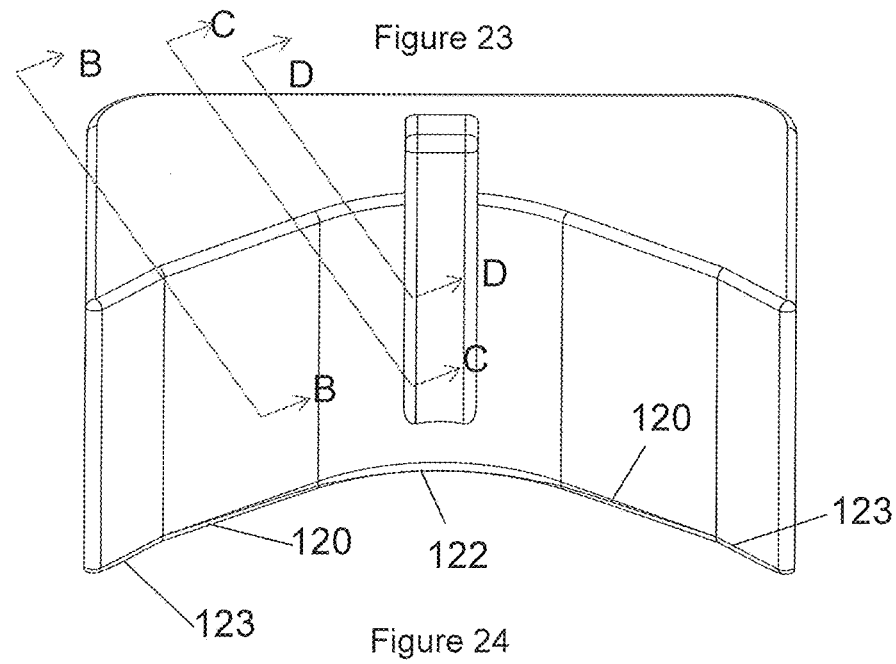
FIG. 24 a perspective view from above of the shear blade of FIG. 23.
Figure 25:
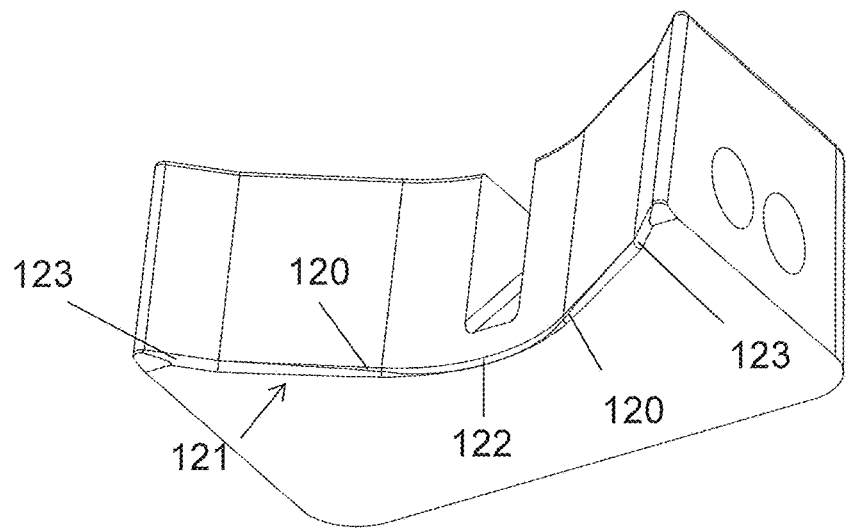
FIG. 25 a perspective view from below of the shear blade of FIG. 23.
Figures 26, 26A:
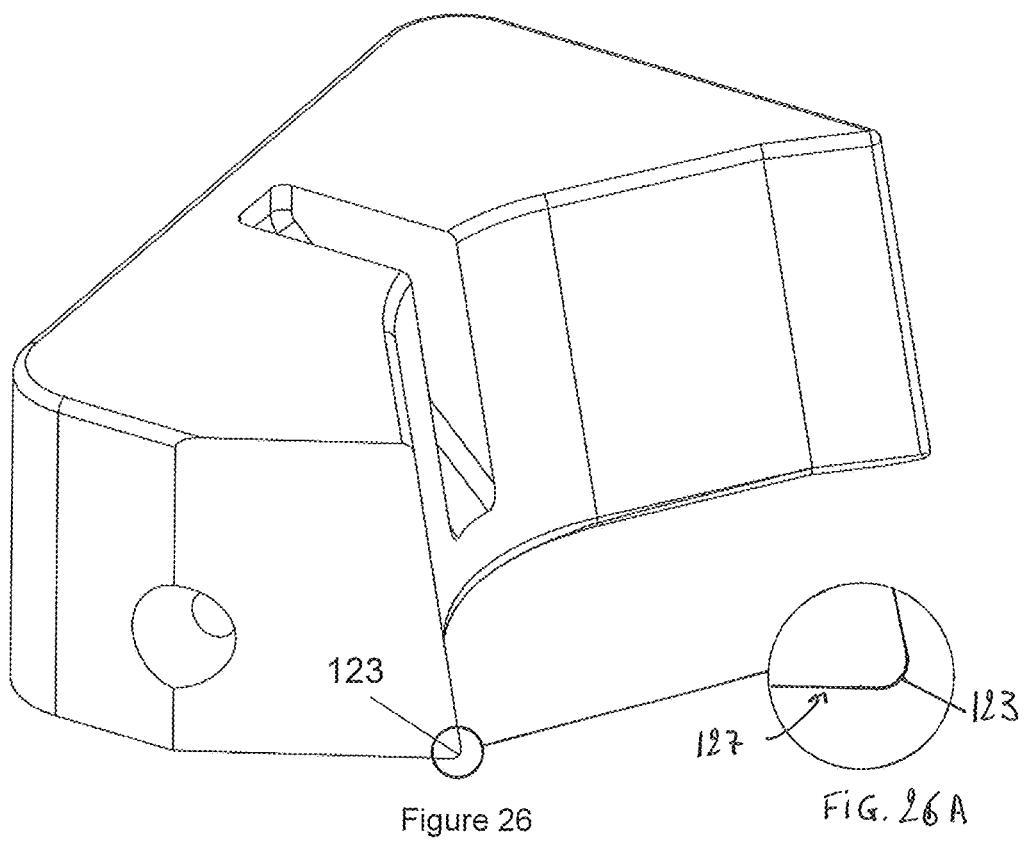
FIG. 26 a part-sectional view from above of the shear blade of FIG. 23 taken along line (B-B)
FIG. 26A an enlarged view of a blunt edge shown in FIG. 26.
Figure 27:
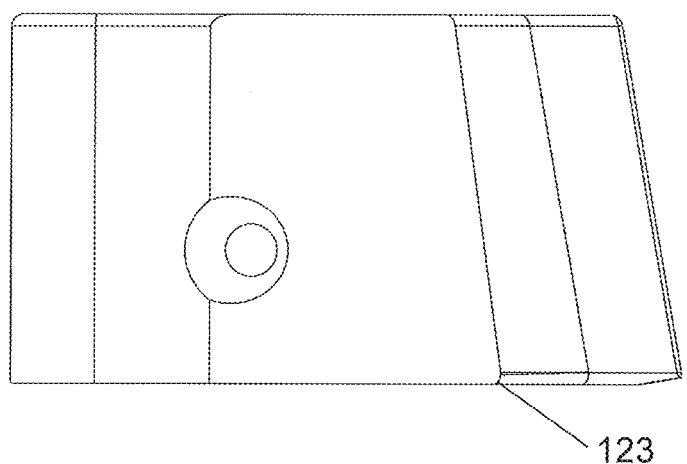
FIG. 27 a side view of the shear blade of FIG. 26.

FIG. 26 shows a part-sectional view from above of the shear blade of FIG. 23 taken along line (B-B) of FIG. 24 through a blunt edge 123 of the first cutting edge 121. As shown in FIG. 26 and the enlarged view shown in FIG. 26A, and in the corresponding side view shown in FIG. 27, the blunt edge 123 has a rounded profile which helps shearing of a tubular or hollow object, such as a tubular or pipe, by applying more stress to the tubular before the tubular fails. This, in turn, provides the "spring" effect in the severed tubular object upon failure due to the physical properties of the material, typically metal, including for example elasticity and resilience, which helps separation of the severed tubular and/or rapid movement of the severed tubular away from the shear blade 110.

FIG. 30 shows a part-sectional view from above of the shear blade of FIG. 23 taken along line (D-D) of FIG. 24 through the sharp edge 122 of the first cutting edge 121. As shown in FIG. 30 and the enlarged view shown in FIG. 30A, and in the corresponding side view shown in FIG. 31, the sharp edge 122 is defined by two adjacent surfaces creating a 90° angle between the first (lower) side 127 and the shear face 130. The provision of a sharp edge 122 located in or near a central region of the first cutting edge 121 helps shearing of a substantially solid object, such as a wireline, in the central portion of the first cutting edge 121.

FIG. 28 shows a sectional view from above of the shear blade of FIG. 23 taken along line (C-C) of FIG. 24 through an intermediate edge 123 of the first cutting edge 121 between the sharp edge 122 and a respective blunt edge 123. As shown in FIG. 28 and the enlarged view shown in FIG. 28A, and in the corresponding side view shown in FIG. 29, the intermediate edge 120 defines an angle between the first (lower) side 127 and the shear face 130 that varies from about 90° near the sharp edge 122 to progressively define an increasingly rounded profile nearer a respective blunt edge 123. The provision of an intermediate edge 120 between the sharp edge 122 and a respective blunt edge 123 provides a smooth and progressive transition in the cutting profile of the first cutting edge 121 between the sharp edge 122 and each blunt edge 123.

Figure 32:
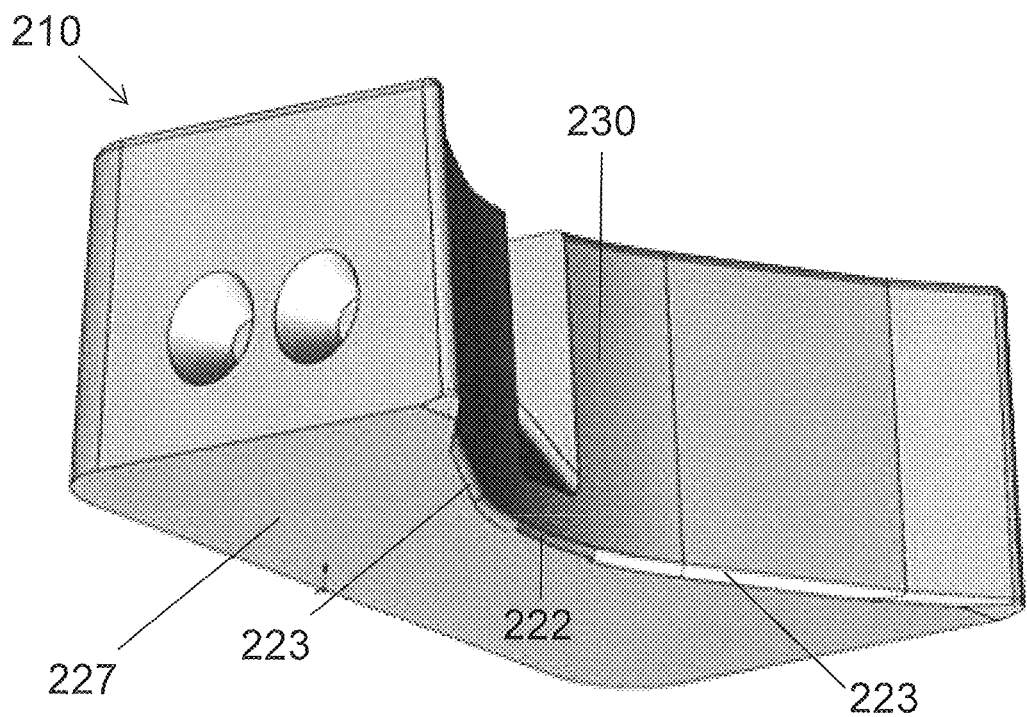
FIG. 32 a perspective view from below of a shear blade according to another embodiment of the present invention.

Referring to FIG. 32 there is shown a perspective view from below of a shear blade, generally designated 210, according to another embodiment of the present invention. The shear blade 210 of FIG. 32 is generally similar to the shear blade of FIG. 1, like part being denoted by like numeral, incremented by '200'.

Figure 33:
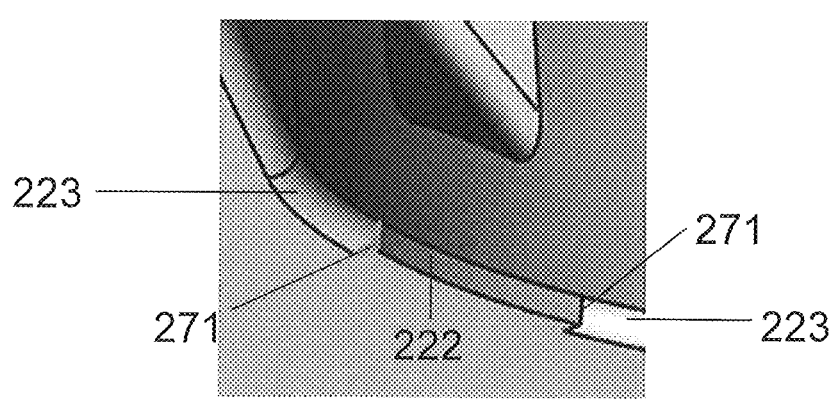
FIG. 33 an enlarged view of a portion of the shear blade of FIG. 32.

In the shear blade 210 of FIGS. 32 and 33, the first cutting edge 121 has a sharp edge 122 (defining a 90° angle between the first (lower) side 227 and the shear face 230) located at or near a central region of the first cutting edge 121, and blunt edges 23 having a rounded profile and located on either side of the sharp edge 222 and adjacent the sharp edge 222, and extending to the outer portions of the first cutting edge 121. Thus, in this embodiment, the first cutting edge 121 does not have any intermediate edges such as those described with reference to FIGS. 23 to 31. Thus, as best shown in the enlarged view of FIG. 33, the interface between the sharp edge 222 and an adjacent blunt edge 223 defines a step 271.

The invention claimed is:

1. A shear blade for a downhole apparatus, the shear blade comprising:
    a body portion; and
    a first cutting edge provided at a cutting end of the shear blade, the first cutting edge comprising a sharp edge located at or near a central region of the first cutting edge, and at least one blunt edge located at or near at least one outer portion of the first cutting edge.

2. A shear blade according to claim 1, comprising a blunt edge located on each side of the sharp edge.

3. A shear blade according to claim 1, wherein each blunt edge extends between the sharp edge and a side portion, outer portion or peripheral portion of the blade or body portion thereof.

4. A shear blade according to claim 2, wherein the first cutting edge has at least one intermediate edge between the sharp edge and a respective blunt edge.

5. A shear blade according to claim 1, wherein the body portion comprises a first side and a second side each extending in a direction substantially perpendicular to a main axis of a throughbore.

6. A shear blade according to claim 5, wherein the body portion includes a shear face between the first side and the second side.

7. A shear blade according to claim 6, wherein the first cutting edge is provided at an edge between the first side and the shear face.

8. A shear blade according to claim 6, wherein the shear blade includes a second cutting edge provided at an edge between the second side and the shear face.

9. A shear blade according to claim 8, wherein, in use, the first cutting edge is forward of the second cutting edge relative to the throughbore.

10. A shear blade according to claim 9, wherein the second cutting edge is substantially blunt.

11. A shear blade according to claim 6, wherein the shear blade includes a recess or slot within a portion of the shear face, wherein the recess or slot extends partially between the first side and the second side.

12. A shear blade according to claim 1, wherein the sharp edge is sharper than the at least one blunt edge.

13. A shear blade according to claim 1, wherein the sharp edge is configured to cut more easily through wellbore equipment than does the at least one blunt edge.

14. A shear blade according to claim 1, wherein the sharp edge and the at least one blunt edge are configured for cutting and/or shearing wellbore equipment.

15. A shear blade for a downhole apparatus defining a throughbore having a main axis, the shear blade comprising:
    a body portion defining a shear face;
    a first cutting edge provided at a cutting end of the shear blade,
    wherein the shear blade comprises a recess or slot extending within a portion of the shear face in a plane substantially parallel to the main axis of the throughbore and/or in a plane substantially perpendicular to the first cutting edge.

16. A shear blade according to claim 15, wherein the body portion has a first side and a second side, the first side and the second side extending substantially perpendicular to the throughbore, the shear face extending between the first side and the second side, and wherein the recess or slot extends at least partially between the first side and the second side.

17. A shear blade according to claim 16, wherein the recess or slot extends between the second side and a portion of the shear face proximal, but not including, the sharp edge of the first cutting edge.

18. A shear blade according to claim 16, wherein the recess or slot defines a recess portion within the second side, the recess portion defining a recess cutting edge facing the throughbore and/or object therein.

19. A method of shearing a tubular in a wellbore, the method comprising:
- providing a tubular in a throughbore of a blowout preventer, the blowout preventer comprising a housing defining the throughbore, and a shear blade, the shear blade having a first cutting edge provided at a cutting end thereof, the first cutting edge comprising a sharp edge located at a central region of the first cutting edge, and at least one blunt edge located at or near at least one outer portion of the first cutting edge;
- moving the shear blade across the throughbore so as to engage the at least one blunt edge of the first cutting edge of the shear blade with the tubular, and
- cutting the tubular at least partially via the at least one blunt edge of the first cutting edge of the shear blade.

20. A method according to claim 19, further comprising engaging a portion of the tubular with the sharp edge of the first cutting edge of the shear blade.

21. The method of claim 20, comprising cutting through a portion of the tubular via the sharp edge and another portion of the tubular via the at least one blunt edge of the first cutting edge of the shear blade.

22. A method of shearing a wireline in a wellbore, the method comprising:
- providing a wireline in a throughbore of a blowout preventer, the blowout preventer comprising a housing defining the throughbore, and a shear blade, the shear blade having a body portion defining a shear face and a first cutting edge provided at a cutting end of the shear blade, wherein the shear blade comprises a recess or slot extending within a portion of the shear face in a plane substantially parallel to a main axis of the throughbore and/or in a plane substantially perpendicular to the first cutting edge;
- moving the shear blade across the throughbore to shear the wireline via the first cutting edge, and
- locating a severed portion of the wireline in the recess or slot.

23. A method according to claim 22, further comprising shearing the severed portion of the wireline via a recess cutting edge, the recess cutting edge being defined by a recess portion of the recess or slot facing the throughbore.

* * * * *